United States Patent
Zhou

(10) Patent No.: US 9,407,538 B2
(45) Date of Patent: Aug. 2, 2016

(54) RING NETWORK FAILURE SWITCHING METHOD AND APPARATUS

(71) Applicant: HUAWEI TECHNOLOGIES CO., LTD., Shenzhen (CN)

(72) Inventor: Chong Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/187,660

(22) Filed: Feb. 24, 2014

(65) Prior Publication Data

US 2014/0169156 A1 Jun. 19, 2014

Related U.S. Application Data

(63) Continuation of application No. PCT/CN2012/073977, filed on Apr. 13, 2012.

(30) Foreign Application Priority Data

Aug. 26, 2011 (CN) .......................... 2011 1 0248105

(51) Int. Cl.
*H04L 12/703* (2013.01)
*H04L 12/437* (2006.01)
*H04L 12/707* (2013.01)
*H04L 12/721* (2013.01)

(52) U.S. Cl.
CPC .............. *H04L 45/28* (2013.01); *H04L 12/437* (2013.01); *H04L 45/22* (2013.01); *H04L 45/66* (2013.01)

(58) Field of Classification Search
None
See application file for complete search history.

(56) References Cited

U.S. PATENT DOCUMENTS

| 2005/0201273 A1 | 9/2005 | Shimizu |
| 2007/0280251 A1 | 12/2007 | Wang et al. |
| 2009/0310481 A1 | 12/2009 | Deng et al. |
| 2010/0074102 A1 | 3/2010 | Mutoh et al. |

(Continued)

FOREIGN PATENT DOCUMENTS

| CN | 1756222 | 4/2006 |
| CN | 1972234 | 5/2007 |
| CN | 1996926 | 7/2007 |

(Continued)

OTHER PUBLICATIONS

*IEEE Standard for Information technology—Telecommunications and information exchange between systems—Local and metropolitan area networks—Specific requirements, Part 17: Resilient packet ring (RPR) access method and physical layer specifications*, IEEE Standards 802.17, IEEE Computer Society, 2004, pp. 1-664.

(Continued)

*Primary Examiner* — Rhonda Murphy
(74) *Attorney, Agent, or Firm* — Staas & Halsey LLP

(57) ABSTRACT

A ring network failure switching method, includes: receiving first data traffic, where the first data traffic includes a destination MAC address; querying a forwarding entry stored in a local node according to the destination MAC address, to obtain a ring network identifier corresponding to the destination MAC address, where the ring network identifier is uniquely corresponding to the first node connected to the destination MAC address; and obtain path state information of a link corresponding to the ring network identifier; and transmitting the first data traffic to the first node in a direction that is opposite to that of the link when the path state information indicates that the link is in a failure state.

20 Claims, 4 Drawing Sheets

(56) References Cited

U.S. PATENT DOCUMENTS

2010/0110881 A1* 5/2010 Ryoo et al. ............ 370/225
2010/0254258 A1 10/2010 Zheng

FOREIGN PATENT DOCUMENTS

| | | |
|---|---|---|
| CN | 101316212 | 12/2008 |
| CN | 101425979 | 5/2009 |
| CN | 101471875 | 7/2009 |
| CN | 101710875 | 5/2010 |
| CN | 102299835 | 12/2011 |

OTHER PUBLICATIONS

International Search Report and Written Opinion, dated Jul. 26, 2012, in corresponding International Application No. PCT/CN2012/073977 (12 pp.).

Office Action, dated Mar. 14, 2013, in corresponding Chinese Application No. 201110248105.5 (7 pp.).

Extended and Supplementary European Search Report issued on Oct. 31, 2014 in corresponding European Patent Application No. 12779501.1.

LAN MAN Standards Committee of the IEEE Computer Society, "Part 17: Resilient packet ring (RPR) access method and physical layer specifications", IEEE Standards Activities Department, Piscataway, NJ, Feb. 2011, 112 Pages.

Kao et al., "Bridging over RPR", Presentation to IEEE 802.17, Jul. 2011, 22 Pages.

International Search Report mailed Jul. 26, 2012, in corresponding International Application No. PCT/CN2012/073977.

* cited by examiner

RING NETWORK FAILURE SWITCHING METHOD AND APPARATUS

CROSS-REFERENCE TO RELATED APPLICATIONS

This application is a continuation of International Application No. PCT/CN2012/073977, filed on Apr. 13, 2012, which claims priority to Chinese Patent Application No. 201110248105.5, filed on Aug. 26, 2011, both of which are hereby incorporated by reference in their entireties.

TECHNICAL FIELD

The present application relates to the field of communications technologies, and in particular, to a ring network failure switching method and apparatus.

BACKGROUND

A ring network technology is a technology in which some network devices are connected to form a ring shape to implement intercommunication, for example, a Layer 2 Ethernet ring network. When data traffic is transmitted through a ring network, the data traffic is usually transmitted by a source node and enters the ring network from a network device (which may be called a ring network node) in the ring network. After being transmitted along a ring network path, the data traffic exits the ring network from another network device and is transmitted to a destination node.

When a certain network device in the ring network fails, the data traffic that flows through the device may be interrupted, so the data traffic transmitted by the source node cannot be transmitted via the original ring network path. At this time, a node in the ring network usually adopts a manner of clearing a media access control (MAC) address and performing MAC address learning again. For example, the data traffic enters the ring network from a first node in the ring network, passes through a second node, reaches an A interface of a third node, and exits the ring network from the third node. The third node may record correspondence between a source MAC address of the data traffic and the A interface, so that when the third node receives traffic to be transmitted to the source MAC address, the third node transmits the traffic through the A interface. When the second node fails, the third node only knows that a failure occurs in the ring network, but does not specifically know the location of the failure in the ring network. If the third node still transmits the traffic through the A interface, a transmission failure may occur. Therefore, when the ring network fails, the third node usually performs broadcast transmission and does not stop broadcasting until the third node receives traffic that flows back to the third node from an opposite direction and determine a path corresponding to the source MAC address along which the traffic can be successfully transmitted, so as to switch the traffic to the new path for transmission. In this manner, efficiency of failure processing in the ring network is rather low. Besides, as the MAC address learning takes a relatively long time, the broadcast traffic is everywhere in the ring network before the third node learns the new MAC address, which greatly increases traffic load pressure on the ring network.

SUMMARY

The objective of the present application is to provide a ring network failure switching method and apparatus, to simplify a failure switching process and increase switching efficiency.

The present application provides a ring network failure switching method, where the ring network includes a local node, a first node, and a link that connects the local node with the first node; the method includes:

receiving first data traffic, where the first data traffic includes a destination media access control (MAC) address;

querying a forwarding entry stored in the local node according to the destination MAC address, to obtain a ring network identifier corresponding to the destination MAC address and path state information of the link corresponding to the ring network identifier, where the ring network identifier is uniquely corresponding to the first node connected to the destination MAC address; and transmitting the first data traffic to the first node in a direction that is opposite to that of the link when the path state information of the link indicates that the link is in a failure state.

The present application provides a ring network failure switching method, where the ring network includes a local node, a second node, and a link that connects the local node with the second node; the method includes:

receiving second data traffic, where the second data traffic includes a source media access control (MAC) address; setting, in the second data traffic, a ring network identifier that is uniquely corresponding to the local node, and transmitting the second data traffic in which the ring network identifier is set to the second node, so that the second node records correspondence between the source MAC address and the ring network identifier in a forwarding entry; and transmitting a link detection packet to the second node through the link, where the link detection packet includes the ring network identifier, so that the second node obtains path state information of the link according to a reception situation of the link detection packet and records the ring network identifier and the path state information in the forwarding entry;

so that when the second node receives first data traffic that includes a destination MAC address, the second node queries the forwarding entry stored in the second node according to the destination MAC address to obtain the ring network identifier corresponding to the destination MAC address and the path state information of the link corresponding to the ring network identifier; and when the path state information indicates that the link is in a failure state, the second node transmits the first data traffic to the local node in a direction that is opposite to that of the link, where the source MAC address is the same as the destination MAC address.

The present application provides a ring network failure switching apparatus, including:

a first receiving unit, configured to receive first data traffic, where the first data traffic includes a destination media access control MAC address;

a first querying unit, configured to query a forwarding entry stored in a local node according to the destination MAC address, to obtain a ring network identifier corresponding to the destination MAC address and path state information of a link corresponding to the ring network identifier, where the ring network identifier is uniquely corresponding to the first node connected to the destination MAC address; and a first processing unit, configured to transmit the first data traffic to the first node in a direction that is opposite to that of the link when the path state information of the link indicates that the link is in a failure state.

The present application provides a ring network failure switching apparatus, wherein the ring network comprises a local node, a second node, and a link that connects the local node to the second node; the apparatus includes:

a second receiving unit, configured to receive second data traffic, where the second data traffic includes a source media access control (MAC) address;

an identifier setting unit, configured to set, in the second data traffic, a ring network identifier that is uniquely corresponding to a local node;

a second processing unit, configured to transmit the second data traffic in which the ring network identifier is set to the second node, so that the second node records correspondence between the source MAC address and the ring network identifier in a forwarding entry; and a detection packet transmitting unit, configured to transmit a link detection packet to the second node through the link, where the link detection packet includes the ring network identifier and a link identifier of the link; so that the second node obtains path state information of the link according to a reception situation of the link detection packet and records the ring network identifier, the link identifier of the link, and the path state information of the link in the forwarding entry;

so that when the second node receives first data traffic that includes a destination MAC address, the second node queries the forwarding entry stored in the second node according to the destination MAC address to obtain the ring network identifier corresponding to the destination MAC address and the path state information of the link corresponding to the ring network identifier; and when the path state information indicates that the link is in a failure state, the second node transmits the first data traffic to the local node in a direction that is opposite to that of the link, where the source MAC address is the same as the destination MAC address.

With the ring network failure switching methods and apparatuses provided by the present application, a corresponding ring network identifier and path state information of a link are obtained according to a MAC address of data traffic and the data traffic is transmitted in a direction that is opposite to that of the link when the link is in a failure state, thereby solving problems of complexity and low efficiency of a ring network failure processing manner, simplifying a failure switching process, and greatly increasing switching efficiency.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present application more comprehensible, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Figure 1:
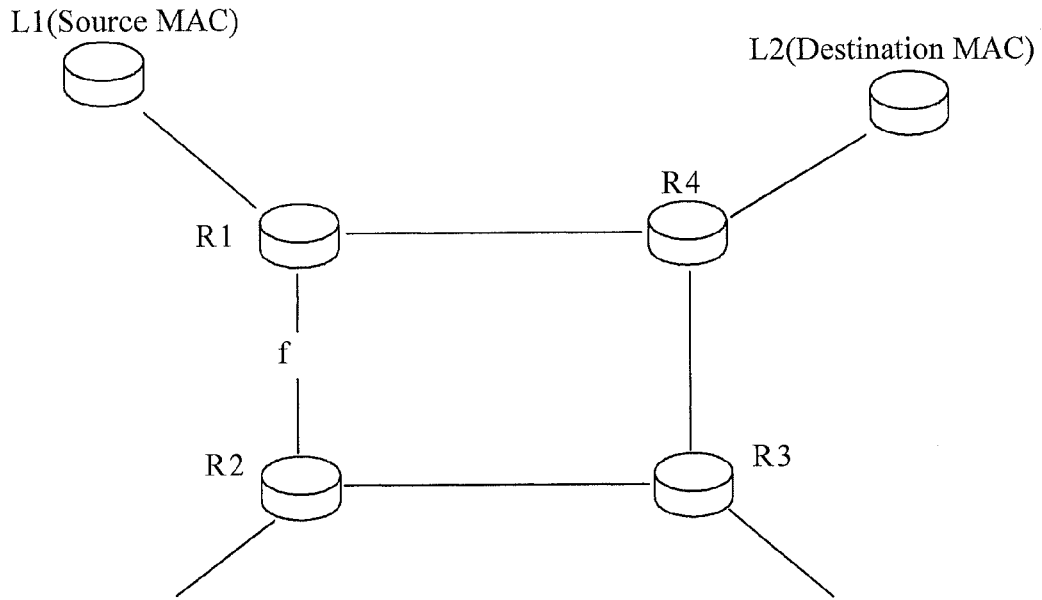
FIG. 1 is a schematic diagram of an architecture of a ring network applied in an embodiment of a ring network failure switching method according to the present application.

To describe a ring network failure switching method more clearly, an embodiment of the present application first provides an architecture of a ring network applied in the switching method, but the switching method is not limited to the ring network. FIG. 1 is a schematic diagram of an architecture of a ring network applied in an embodiment of a ring network failure switching method according to the present application. As shown in FIG. 1, the ring network is a ring network formed by four ring network nodes, and the four ring network nodes are respectively an R1, an R2, an R3, and an R4. The nodes are connected through links, for example, a link f between the R1 and the R2. The link f is bidirectional, that is, data traffic may flow from the R1 to the R2 through the link f, or flow from the R2 to the R1 through the link f.

It is assumed that data traffic passes through the ring network, and the data traffic is transmitted from a source node L1 (a MAC address of the source node L1 is a source MAC address of the data traffic) to a destination node L2 (a MAC address of the destination node L2 is a destination MAC address of the data traffic). It is assumed that, the data traffic transmitted by the source node L1 may be transmitted to the node R1 in the ring network and enters the ring network from the node R1, where the node R1 may be called a ring-in node; after the data traffic is transmitted in the ring network, the data traffic exits the ring network from the node R4 and may be transmitted to the destination node L2, where the node R4 may be called a ring-out node. Correspondingly, data traffic from an opposite direction may also occur, that is, the node L2 may also transmit another data traffic, and the data traffic enters the ring from the node R4, exits the ring from the node R1, and is further transmitted to the node L1. At this time, the node L2 is a source node, and the node L1 is a destination node.

The following embodiments describe a switching method by taking a ring network with the foregoing architecture the structure and the two types of data traffic as examples.

Embodiment 1

Figure 2:
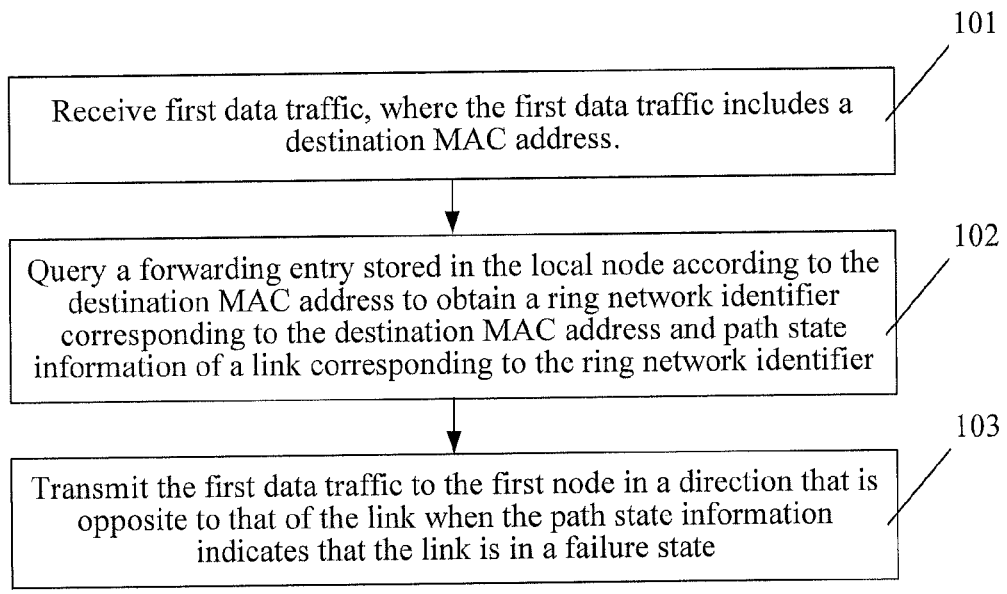
FIG. 2 is a schematic flowchart of an embodiment of a ring network failure switching method according to the present application.

FIG. 2 is a schematic flowchart of an embodiment of a ring network failure switching method according to the present application. In the switching method in the embodiment, the R1 in the ring network shown in FIG. 1 may be defined as a first node, and the R2, R3, or R4 in the ring network may be called a local node device. The switching method in the embodiment is executed by a local node device.

As shown in FIG. 2, the method may include:

101. Receive first data traffic, where the first data traffic includes a destination MAC address of the first data traffic.

The first data traffic is traffic that enters the ring network, and is specifically data traffic that enters the ring network from the node R4 after being transmitted from the node L2 and needs to exit the ring network from the node R1 to reach the node L1 after passing through the ring network. For the node R4, the traffic enters the ring network from a local node device. If the traffic is transmitted in a node R4-node R3-node R2-node R1 direction, for the node R2 or the node R3, the traffic enters the ring network from another node in the ring network and flows through a local node device. Certainly, the traffic may also be transmitted along a node R4-node R1 path.

The destination MAC address is a destination address of the first data traffic. In the embodiment, the destination MAC address carried by the first data traffic is a MAC address of the node L1.

102. Query a forwarding entry stored in the local node according to the destination MAC address to obtain a ring network identifier corresponding to the destination MAC address and path state information of a link corresponding to the ring network identifier.

A forwarding entry is stored in the local node, and in the forwarding entry, correspondence between the MAC address and the ring network identifier and the path state information of the link corresponding to the ring network identifier are stored.

Specifically, the ring network identifier is uniquely corresponding to a ring network node in the ring network, and is set by the first ring network node that data traffic passes through when entering the ring network, namely, a ring-in node. Besides, the ring network identifier is set as corresponding to a source MAC address of the data traffic received by the ring-in node.

The following is an example for description. It is assumed that, data traffic transmitted by the node L1 as a source node enters the ring network from the node R1. Then, when receiving the data traffic, the node R1 inserts a ring network identifier a in the data traffic. The ring network identifier a is used for identifying the ring network in which the node R1 is a ring-in node, which is equivalent to recording that the traffic with the node L1 as a source node enters the ring network from the node R1. However, the ring network identified by the ring network identifier a is not limited in terms of direction. When traffic from an opposite direction occurs, in the ring network, the node R1 may also be a ring-out node for the traffic. Correspondingly, it is assumed that, the data traffic flows through a local node device (it is assumed that, the local node device is the node R4) along a node R1-node R2-node R3-node R4 path. Then, the local node device may record correspondence between a source MAC address of the data traffic (the MAC address of the node L1) and the ring network identifier a in the forwarding entry, so that when the local node receives traffic from an opposite direction, namely, data traffic with the MAC address of the node L1 as an destination MAC address, next time, the local node may directly learn that the data traffic is to be transmitted to the node R1 corresponding to the ring network identifier a according to the correspondence.

The foregoing takes the data traffic with the node R1 as a ring-in node as an example. In the traffic, the ring network identifier a is set by the node R1. When data traffic enters the ring network from another node in the ring network, a different ring network identifier is set. For example, if traffic enters the ring network from the node R2, the node R2 may set a ring network identifier b in the traffic, and the ring network identifier b is different from the ring network identifier a. That is, when different nodes in the ring network are ring-in nodes, ring network identifiers set in traffic that enters the ring network are different, so that ring networks with different nodes as endpoints can be distinguished. For example, the ring network identifier a represents the ring network with the node R1 as an endpoint, and the ring network identifier b represents the ring network with the node R2 as an endpoint, where the endpoint may refer to a ring-in node or a ring-out node in the ring network.

In this embodiment, it can be learned by querying the forwarding entry that the ring network identifier corresponding to the destination MAC address (the MAC address of the node L1) is corresponding to the node R1. In specific implementation, in the forwarding entry of the local node, only the correspondence between the destination MAC address and the ring network identifier may be recorded and correspondence between the first node R1 and the ring network identifier does not need to be recorded. This is because when recording the correspondence between the destination MAC address and the ring network identifier, the local node may use an interface through which the ring network identifier is received as an output interface for the data traffic with the MAC address as the destination address. When receiving the data traffic, the local node may directly output the data traffic through the output interface.

For example, two links exist between a node corresponding to a ring network identifier and a local node device. For example, links between the node R1 and a local node device include a first link and a second link that form a ring shape, that is, the node R1 may be connected to the local node device R4 through the first link node R1-node R2-node R3-node R4, or may be connected to the local node device R4 through the second link R1-R4. The two links may be distinguished by link identifiers, which, for example, may be a first link and a second link.

Specifically, the path state information of the link refers to whether the link is in a normal state or in a failure state. In specific implementation, for example, a manner of transmitting a link detection packet may be adopted to determine the path state information of the link according to a reception situation of the link detection packet. If the packet can be successively received according to a preset condition, it indicates that the link is normal; if the packet is not received, it indicates that the link fails. The link detection packet may be transmitted by the first node R1, and a ring network identifier is set in the link detection packet, so that the local node devices R2, R3, and R4 may identify a link according to the ring network identifier and record path state information of the link. The preset condition may refer to receiving a packet per 50 ms and the number of packets that are successively lost does not exceed 3.

103. Transmit the first data traffic to the first node in a direction that is opposite to that of the link when the path state information indicates that the link is in a failure state.

The local node device may use an interface through which the local node receives the ring network identifier as an output interface for data traffic with a certain MAC address as a destination address. For example, data traffic received by the local node device through a first interface includes a source MAC address of the data traffic and a ring network identifier a, so the local node device uses the first interface as an output interface corresponding to the source MAC address. When the local node device receives first data traffic next time, if a destination address of the first data traffic is the source MAC address, the local node device outputs the traffic through the output interface, so that the first data traffic is transmitted along the link corresponding to the ring network identifier a.

If the local node device learns, by querying the forwarding entry, that a link corresponding to the ring network identifier a is in a failure state, the local node device transmits the first data traffic in a direction that is opposite to that of the link corresponding to the ring network identifier a. For example, it is assumed that, the ring network identifier a is corresponding to the node R1; a ring network corresponding to the ring network identifier a includes two links, which are respectively a first path through which the node R1 is connected to the local node device from the left side and a second path through which the node R1 is connected to the local node device from the right side; the first data traffic is transmitted along the first path from the node R1 to the local node device; but in the forwarding entry it is recorded that a failure occurs on the first path. Then, the local node device may transmit the traffic along the second path.

In comparison with a ring network failure switching method in the prior art, in the switching method in the embodiment, the forwarding entry is stored in the local node device in the ring network, and the MAC address and the path state information of the link corresponding to the MAC address are recorded in the forwarding entry, so that when receiving the data traffic, the local node device can learn whether the transmission path corresponding to the traffic is in a normal state according to the destination MAC address of the traffic, and when the local node device learns by querying that a failure occurs on the link, the local node device can automatically transmit the traffic along another path; the nodes in the ring network can learn whether the transmission path is clear and also can automatically change the transmission path of the traffic, without the need for complex processing such as exchanging packets among the nodes and MAC learning in the prior art. Therefore, efficiency of ring network failure switching is greatly increased, and a processing manner is simplified.

With the ring network failure switching method according to this embodiment, the corresponding ring network identifier and path state information of the link are obtained according to the MAC address of the data traffic, and the data traffic is transmitted in a direction that is opposite to that of the link when the link is in a failure state, thereby solving problems of complexity and low efficiency of a ring network failure processing manner, simplifying a failure switching process, and greatly increasing switching efficiency.

Embodiment 2

Figure 3:
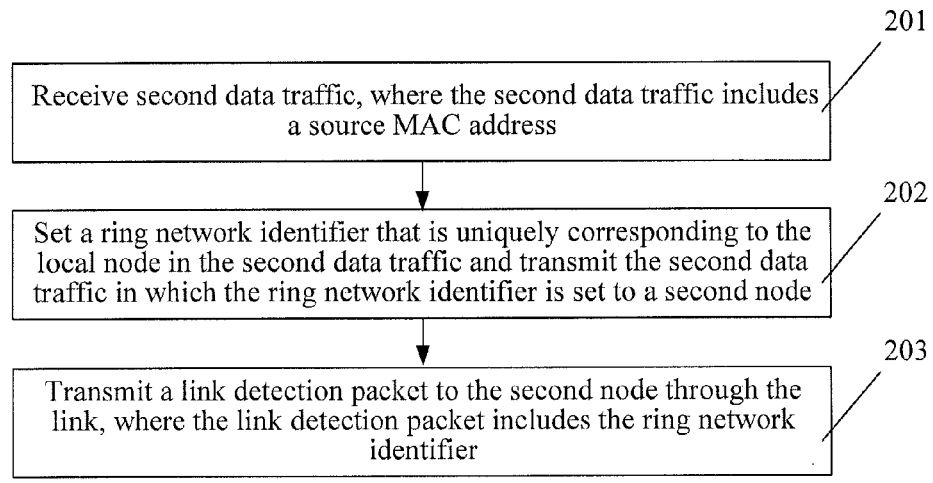
FIG. 3 is a schematic flowchart of another embodiment of a ring network failure switching method according to the present application.

FIG. 3 is a schematic flowchart of another embodiment of a ring network failure switching method according to the present application. In the switching method in the embodiment, the node R2, node R3, or node R4 in the ring network may be called a second node, and the R1 is defined as a local node device; the switching method in the embodiment is executed by the local node device.

As shown in FIG. 3, in the method according to this embodiment, the local node device needs to execute an action of setting a ring network identifier in 201 to 202 and an action of transmitting a link detection packet in 203. The two aspects are in a parallel relationship, and their execution order is not limited; the method may include:

201. Receive second data traffic, where the second data traffic includes a source MAC address;

The second data traffic received by the local node device is traffic that enters the ring network and is specifically traffic that enters the ring network from the node R1 after being transmitted from the node L1 and needs to exit the ring network from the node R4 to reach the node L2 after passing through the ring network; the local node device R1 is a ring-in node of the ring network. The second data traffic includes the source MAC address of the data traffic, which is a MAC address of the node L1.

202. Set, in the second data traffic, a ring network identifier that is uniquely corresponding to the local node, and transmit the second data traffic in which the ring network identifier is set to a second node.

When the local node device receives the second data traffic in 201, the local node device set a ring network identifier in the traffic, where the ring network identifier is used for identifying the ring network in which the local node device is a ring-in node or a ring-out node. The ring network identifier is uniquely corresponding to the local node device, that is, if the second data traffic that comes from the source MAC address enters the ring network from another node, the another node may set another ring network identifier for the second data traffic. As different ring network identifiers are corresponding to different ring network nodes and the ring network node is corresponding to the MAC address of the source node, the ring network identifier is corresponding to a link, where the link is a link through which the data traffic with the MAC address of the source node as a destination address is transmitted to the ring network node.

The local node device transmits the second data traffic in which the ring network identifier is set to the second node, so that after the second local node receives the traffic, the second node may record correspondence between the source MAC address of the second data traffic and the ring network identifier in a forwarding entry stored in the second node. A function of recording the correspondence is that when receiving data traffic with the MAC address as a destination MAC address, the second node can learn that the traffic is to be transmitted to the link corresponding to the ring network identifier according to the correspondence.

203. Transmit a link detection packet to the second node through the link, where the link detection packet includes the ring network identifier.

In 201-202, the local node device sets the ring network identifier in the data traffic and transmits the data traffic to the second node, so that the second node can identify the link represented by the ring network identifier according to the MAC address in the traffic. In 203, the local node device transmits the link detection packet that includes the ring network identifier, so that the second node can learn whether the link is in a normal state according to a reception situation of the packets.

Specifically, the link detection packet includes the ring network identifier so that the second node can identify that the packets are corresponding to the link represented by the ring network identifier. The second node can obtain, according to a reception situation of the packets, path state information of the link, for example, the link is in a normal state or a failure state. If the packets can be received successively according a preset condition, it indicates that the link is normal; if the packets are not received, it indicates that the link fails. The second node may record the ring network identifier and the path state information of the link corresponding to the ring network identifier in the forwarding entry on the second node side.

In this embodiment, the second node not only records the ring network identifier corresponding to the source MAC address of the node L1 so as to identify the link corresponding to the destination MAC address of the second data traffic (a link between the R1 and the second node) but also records the path state information of the link. Therefore, when receiving data traffic, the second node may query the forwarding entry stored in the local node according to a destination MAC address in the data traffic to obtain the ring network identifier corresponding to the destination MAC address and path state information of a link corresponding to the ring network identifier. When the path state information indicates that the link is in a failure state, the second node transmits the traffic in a direction that is opposite to that of the link, thereby implementing automatic switching when the ring network fails and greatly increasing switching efficiency.

With the ring network failure switching method in this embodiment, the corresponding ring network identifier and path state information of the link are obtained according to the MAC address of the data traffic and the data traffic is transmitted in a direction that is opposite to that of the link when the link is in a failure state, thereby solving problems of complexity and low efficiency of a ring network failure processing manner, simplifying a failure switching process, and greatly increasing switching efficiency.

Embodiment 3

This embodiment describes the switching methods in embodiment 1 and embodiment 2 in more detail by taking the ring network shown in FIG. 1 as an example. Besides, the embodiment takes a Layer 2 Ethernet ring network as an example, but in specific implementation, the methods are also applicable to other link layer protocols of a non-Ethernet link.

Figure 4:
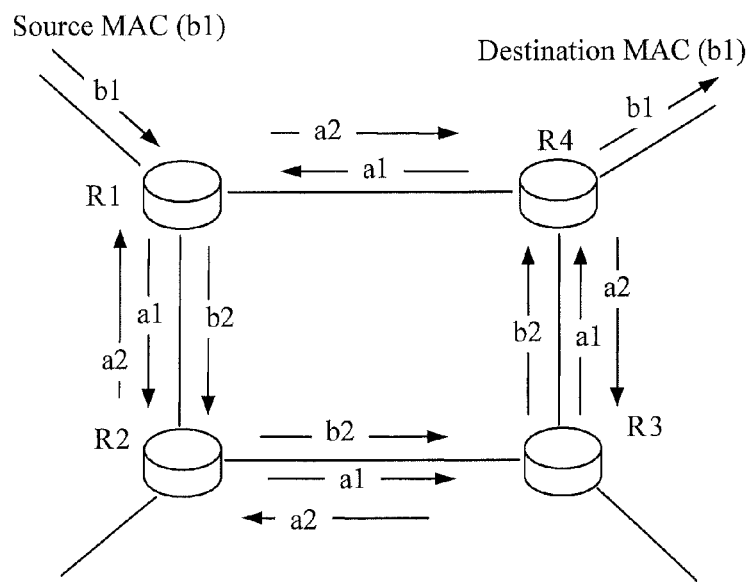
FIG. 4 is a schematic diagram of a ring network normal state in still another embodiment of a ring network failure switching method according to the present application.
Figure 5:
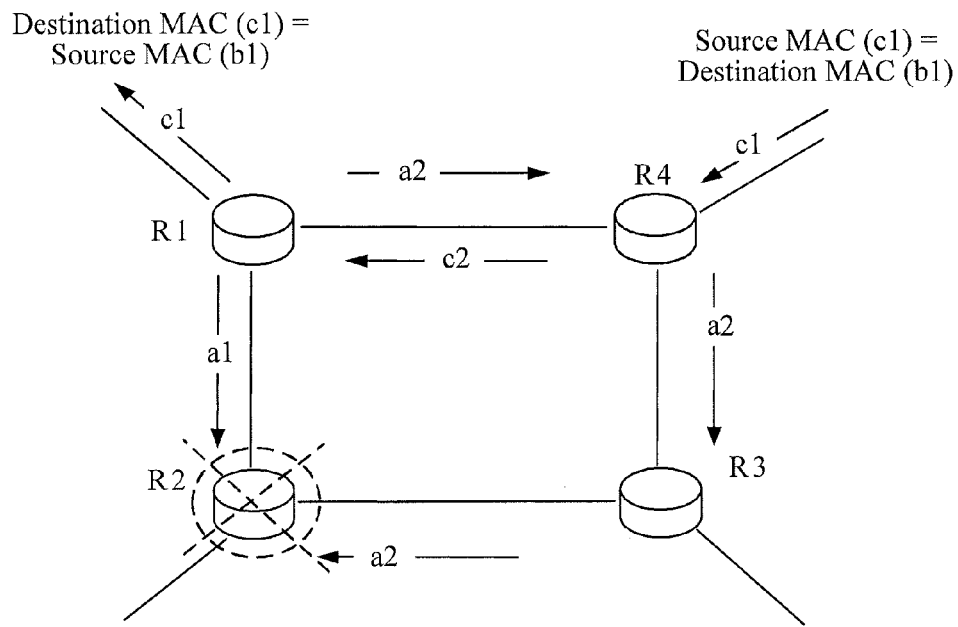
FIG. 5 is a schematic diagram of a ring network failure state in still another embodiment of a ring network failure switching method according to the present application.

FIG. 4 is a schematic diagram of a ring network normal state in still another embodiment of a ring network failure switching method according to the present application; FIG. 5 is a schematic diagram of a ring network failure state in still another embodiment of a ring network failure switching method according to the present application.

As shown in FIG. 4, a ring network is in a normal state, each of ring network nodes R1 to R4 in the embodiment transmits a link detection packet, and the node R1 as a ring-in node sets a ring network identifier in data traffic that enters the ring network. The following respectively describes sending of the link detection packet and setting of the ring network identifier in the data traffic.

Specifically, the node R1 is taken as an example, and reference may be made to Table 1 shown below for a packet format of a link detection packet transmitted by the node R1.

TABLE 1

| Link detection packet structure | | | | | |
|---|---|---|---|---|---|
| 0 | 1 | 2 | 3 | 4 | 5 |
| | | DMAC | | | |
| | | SMAC | | | |
| | Type | | | Label | |
| Flag | TLV | | | TLV | |
| | Num | | | | |
| | | TLV | | | |

The packet includes a ring network identifier (Label), and the ring network identifier is uniquely corresponding to the node R1; in specific implementation, the ring network identifier may be set behind a link layer packet header of the packet, and the link layer packet header herein refers to DMAC, SMAC, and Type. For example, a multi-protocol label switching (MPLS) identifier may be adopted as the ring network identifier, or another identifying symbol that can be used for uniquely identifying a ring network node may be adopted as the ring network identifier.

For example, in the link layer packet header in this embodiment, DMAC and SMAC may be set to any value. For example, a MAC address of the node R1 may be DMAC or SMAC, which means that the node R1 is defined as both a source MAC address and a destination MAC address of the link detection packet, therefore the link detection packet may be transmitted from the node R1 and return to the node R1 after being transmitted to the ring network nodes successively; even if DMAC and SMAC is set to any value, as the ring network is a unidirectional channel, the packet transmitted by the node R1 may return to the node R1 after being transmitted in the ring network. In Type, a protocol type of the packet is defined. As the link detection packet is a packet newly added for the ring network nodes in the embodiment of the present application, the protocol type in Type is a new protocol type that does not conflicts with an existing protocol.

For example, a length of Flag that is positioned behind Label in the packet in this embodiment may be 8 bits, and for a main format of Flag and content included in Flag, reference may be made to Table 2 shown below.

TABLE 2

| Structure of Flag in the link detection packet | | | | | | | |
|---|---|---|---|---|---|---|---|
| 0 | 1 | 2 | 3 | 4 | 5 | 6 | 7 |
| Main Ver | | | Sub Ver | | L | M | T |
| | | | Flag | | | | |

In the Flag, a 3-bit main version (Main Ver) is 001 by default; a 2-bit subversion (Sub Ver) is 00 by default; in a 1-bit left/right direction identifier, 1 indicates a left direction L, and 0 indicates a right direction R; in a 1-bit main/standby priority identifier, 1 indicates a main priority M, 0 indicates a standby priority S; in a 1-bit TLV-bearing mark, 1 indicates that TLV exists, and 0 indicates that TLV does not exist. The left/right direction identifier and the main/standby priority identifier are described later.

For example, the link detection packet in this embodiment also includes a type-length-value (TLV), and TLV Num shows the number of TLVs borne by the packet; when the TLV-carrying mark in Flag is 0, TLV Num must be 0. The TLV bears ring network attribute information, such as a device IPv4 identifying ID, a device IPv6 identifying ID, a device name character string, device load information, a link traffic report, a link quality report, an interval for transmitting the link detection packet, encryption authentication information, and a packet serial number. In specific implementation, content of the TLV is not limited to the above and may be extended as needed.

In the foregoing content borne by TLV, the device IPv4 identifying ID, the device IPv6 identifying ID, and the device name character string are all device identifiers of the R1, which can help locate a device that transmits a detection packet when a problem occurs in the packet; the device load information, the link traffic report, and the link quality report can help master a link load, link quality, and the like in the ring network; the interval for transmitting the link detection packet can help a node receiving packets in the ring network determine a reception situation of the packets; and the encryption authentication information can help effectively identify a forged packet to ensure authenticity of a detection packet.

On the basis of the description of the format of the link detection packet, a manner of transmitting packets by the node R1 is described blow. As shown in FIG. 4, the node R1 may transmit packets in two directions, of which one is a link detection packet transmitted along an a1 loop in the ring network and the other is a link detection packet transmitted along an a2 loop in the ring network. The two packets may be distinguished by using the left/right direction identifier in Flag. For example, the a1 loop packet may be defined as a left direction L packet, and the a2 loop packet may be defined as a right direction R packet.

The purpose of transmitting the packets in the two directions is explained herein by taking the ring network node R4 as an example (the R4 in the embodiment is a ring-out node). If the R4 can normally receives the a1 loop packet, it only indicates that a link from the R1 to the R4 in an a1 loop direction is in a normal state, but a state of a link from the R4 to the R1 in the a1 loop direction is unknown; similarly, if the R4 can normally receives the a2 loop packet, it only indicates that a link from the R1 to the R4 in an a2 loop direction is in a normal state, but a state of a link from the R4 to the R1 in the a2 loop direction is unknown. Therefore, if the data traffic enters the ring network from the R1 and exits the ring network from the R4, the data traffic may pass through two paths, which are a path from the R1 to the R4 in the a1 loop direction and a path from the R1 to the R4 in the a2 loop direction. In order to know path states of the two paths more clearly, the manner of transmitting packets in the two directions is adopted. Similarly, the nodes R2 and R3 in the ring network may also obtain information about states of links on the two sides of the nodes according to the link detection packet, so that when a failure occurs on the link, all the ring network nodes can perceive the link failure and select a normal link to perform traffic transmission, which increases failure processing efficiency.

When the manner of transmitting packets in the two directions is adopted, the link from the R1 to the R4 in the a1 loop direction may be defined as a first path, and the link from the R1 to the R4 in the a2 loop direction may be defined as a second path; the R4 may learn whether the first path and the second path are in a normal state according to a reception situation of the link detection packets. For example, if the R4 successively receives n (3 by default) correct link detection packets in a prescribed period of time, it indicates that the link is normal; if the R4 does not successively receive n (3 by default) correct link detection packets in a prescribed period of time, it indicates that the link fails. The number of successively received packets may be set to another value except 3, and the prescribed period of time may also be set autonomously or determined according to the packet transmission interval in TLV of the link detection packets. For example, both the first path and the second path are in a normal state.

After obtaining path state information of the links in the foregoing detection manner, the R4 may record the path state information of the links in the forwarding entry stored in the R4. Specifically, the R4 may record the ring network identifier in the link detection packet and the path state information of the first path and the second path corresponding to the ring network identifier, and may also distinguish the first path from the second path according to a link identifier, where the link identifier may be the left/right direction identifier in Flag of the link detection packet, the first path is corresponding to the L (Left) direction, the second path is corresponding to the R (Right) direction, and the two directions have the same ring network identifier. For example, the R4 records Label, the Label is corresponding to the L (Left) direction link, and the state of the link is normal.

All the nodes in the ring network can detect a state of the ring network in which the nodes reside by using a link detection packet; for example, when the R1 receives a packet transmitted by itself, it is confirmed that the ring network is clear; when the R4 receives a packet transmitted by the R1, it is confirmed that a link between the R1 and R4 is normal.

The R1 not only transmits the link detection packet that carries the ring network identifier, but also sets the ring network identifier in traffic that enters the ring network. Specifically, when the R1 receives data traffic b1, where the data traffic b1 is transmitted from a source MAC address to the R1, and the source MAC address is included in the data traffic; the R1 may set a ring network identifier in the data traffic, where the ring network identifier is the same as the ring network identifier in the link detection packet described above. For manners of setting a ring network identifier in data traffic, reference may be made to Table 3 and Table 4.

TABLE 3

Example 1 of a structure of a ring network identifier set in data traffic

| DMAC | SMAC | Type | Data | |
|------|------|------|------|------|
| DMAC | SMAC | Type | Label | Data |

TABLE 4

Example 2 of a structure of a ring network identifier set in data traffic

| DMAC | SMAC | Type | VLAN | Data | |
|------|------|------|------|------|------|
| DMAC | SMAC | Type | VLAN | Label | Data |

The ring network identifier may be set behind a link layer packet header of the data traffic and in front of a data bearing layer of the data traffic; after the ring network identifier is set, the data traffic b1 may be called data traffic b2 to be distinguished from the b1. The R1 may transmit the data traffic to the R4 through the first path. After receiving the data traffic b2, the R4 records, in its forwarding entry, correspondence between a source MAC address and a ring network identifier in the data traffic b2, that is, data traffic to be transmitted to the source MAC address needs to be transmitted to a link corresponding to the ring network identifier.

It must be noted herein that the number of the links corresponding to the ring network identifier may be two, for example, the first path and the second path; but the data traffic to be transmitted to the source MAC address can be transmitted only along one of the paths, therefore when the R1 transmits a link detection packet, priorities of the two paths may be preset. Specifically, for example, the R1 is connected to a first interface of the R4 through the first path, and the R1 is connected to a second interface of the R4 through the second path; when the R1 transmits packets in two directions, a main/standby priority identifier is set in Flag of the packets, and main/standby priorities set for the two directions are different.

For example, if a main priority is set for a packet corresponding to the first path, and a standby priority is set for a packet corresponding to the second path, which means that when the R4 needs to transmit data traffic to the R1, the R4 preferentially selects the first path for transmission, and when the first path fails, the R4 then selects the second path for transmission. That is, by setting the main/standby priorities, the R4 determines that its first interface is an output interface for the data traffic to be transmitted to the source MAC address, thereby binding the ring network identifier and the interface together.

In this embodiment, the R4 is a ring-out node for the data traffic b2, and the data traffic b2 may be transmitted to a destination MAC address from the R4. The R4 deletes the ring network identifier in the data traffic b2 before transmitting the data traffic b2. The data traffic b2 in which the ring network identifier is deleted again becomes the original data traffic b1 and is transmitted to a destination MAC address.

Further, if the R1 receives data traffic that is transmitted by the R1 as a ring-in node to the ring network, for example, if the R1 receives the data traffic b2, it indicates that the data traffic b2 fails to find a ring network node that is connected to the destination MAC address in the ring network; at this time, the R1 may directly discard the data traffic b2 to implement blocking of a packet transmitted by the R1, thereby avoiding repeated forwarding in the ring network and better reducing a ring network load. Specifically, in comparison with the prior art, in the prior art, when data traffic for which a MAC address is not specified (that is, data traffic for which a receiving node is not specified, which needs to be transmitted to a node for the node to determine whether to receive the traffic or not) is transmitted, to enable the traffic to exit a ring network successfully, a blocking point is usually set in the ring network; when a ring network node transmits traffic in one direction, the traffic may encounter the blocking point instead of a receiving node, so the traffic may fail to be transmitted; to avoid that, a manner of broadcast transmission is usually adopted, which causes a heavy ring network load; but in this embodiment, the R1 functions as a blocking point, so the R1 can transmit traffic in one direction and ensure that the traffic can exit a ring network successfully, thereby reducing a ring network load; even if the traffic fails to find a receiving point, the R1 can implement self-blocking as described above.

As shown in FIG. 5, a ring network is in a failure state. It is assumed that, an R2 in the ring network fails, and then among link detection packets transmitted by an R1, both packets transmitted in an a1 direction and packets transmitted in an a2 direction are interrupted on the R2. If an R4 does not successively receive the packets transmitted in the a1 direction in a prescribed period of time, it can be learned that a first path is in a failure state; if the R4 can receive the packets transmitted in the a2 direction, it can be learned that a second path is in a normal state. Similarly, an R3 may also learn that a path from the R1 to the R3 in the a1 direction is in a failure state and a path from the R1 to the R3 in the a2 direction is in a normal state by listening to the link detection packet transmitted by the R1. Both the R4 and the R3 record the obtained path state information in their forwarding entries, for example, the first path changes from a normal state to a failure state.

In this embodiment, a source MAC address of data traffic c1 received by the R4 as a ring-in node is the destination MAC address of the data traffic b1 shown in FIG. 4, and a destination MAC address of the data traffic c1 is the source MAC address of the data traffic b1.

After receiving the data traffic c1, the R4 can obtain, by querying its forwarding entry, a ring network identifier according to the destination MAC address of the data traffic c1, that is, the R4 can obtain the ring network identifier corresponding to the R1, so that the R4 can learn that the data traffic needs to be transmitted to the R1. Similarly, when receiving the data traffic c1, the R4 also set a ring network identifier that is uniquely corresponding to the R4 in the data traffic c1, and the details are not repeated herein. The data traffic to which the ring network identifier is added may be called data traffic c2.

The R4 then obtains, according to the obtained ring network identifier, path state information of a link corresponding to the ring network identifier from the forwarding entry, for example, as described above, it is recorded in the forwarding entry of the R4 that the first path of the main priority corresponding to the destination MAC address is in a failure state and the second path of the standby priority is in a normal state; so the R4 automatically switches an output interface for the data traffic c2 from a first interface to a second interface that is in an opposite direction. Similarly, it is assumed that, another device R5 (not shown in FIG. 5) except the R1 and the R4 exists on the second path. Then the R5 can also perceive that a link in an R2 direction fails and automatically switch an output interface to be in a direction that is opposite to the R2 direction, so as to be consistent with the switching of the R4. In this way, the data traffic can be successfully transmitted along the normal path to the R1. When the data traffic c2 exits the ring network from the R1, the R1 may delete the ring network identifier corresponding to the R4 in the data traffic c2, so that the data traffic c2 again becomes the data traffic c1 and is transmitted to a destination MAC address.

In this embodiment, if the R4 does not receive packets on both sides, that is, if both the first path and the second path fail, the R4 may transmit the data traffic in a direction of a main priority according to a set link priority identifier in a link detection packet of the R4; or if the priority is not set, the R4 may transmit the data traffic through broadcast transmission.

It must be noted that in specific implementation, a manner of transmitting a link detection packet may be chosen flexibly; for example, the manner of transmitting a link detection packet in two directions may not be adopted. It is assumed that, the R1 only transmits packets in the a1 direction, and the R4 can only obtain information about a link from the R1 to the R4 in the a1 loop direction. Then at this time, the R4 may be configured so that the R4 chooses an interface through which the packet is received as an output interface of a higher priority by default, and when the R4 receives data traffic, the R4 transmits the traffic through the interface preferentially, and when it is detected that the link fails, the R4 automatically transmits the traffic in a direction that is opposite to that of the link by default.

Further, when the switching method in this embodiment is applied to an environment where multiple ring networks are nested, the ring network identifier may be a ring network identifier having nested layers, as long as the ring network identifier has the function of uniquely identifying a ring network that is corresponding to a node in the ring network.

The ring network failure switching method in this embodiment obtains the corresponding ring network identifier and path state information of the link according to the MAC address of the data traffic, and transmits the data traffic in a direction that is opposite to that of the link when the link is in a failure state, thereby solving problems of complexity and low efficiency of a ring network failure processing manner, simplifying a failure switching process, and greatly increasing switching efficiency.

Embodiment 4

Figure 6:
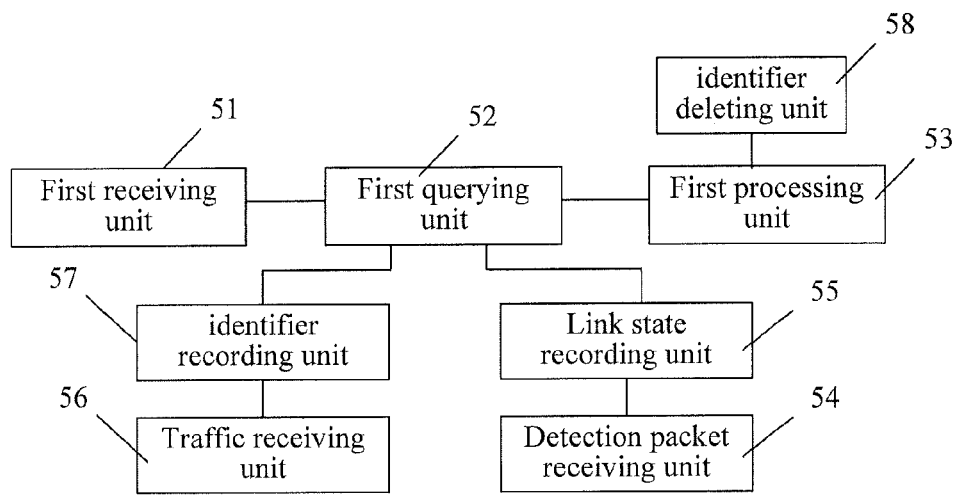
FIG. 6 is a schematic structural diagram of an embodiment of a ring network failure switching apparatus according to the present application.

FIG. 6 is a schematic structural diagram of an embodiment of a ring network failure switching apparatus according to the present application. The apparatus may be the R4 in FIG. 5, which can implement a ring network failure switching method in any embodiment of the present application. In the embodiment, a structure of the apparatus is briefly described. Reference may be made to the method embodiments for working principles of the apparatus, which are not repeated herein.

As shown in FIG. 6, the apparatus may include: a first receiving unit 51, a first querying unit 52, and a first processing unit 53, where the first receiving unit 51 is configured to receive first data traffic, where the first data traffic includes a destination MAC address; the first querying unit 52 is configured to query a forwarding entry stored in a local node according to the destination MAC address to obtain a ring network identifier corresponding to the destination MAC address, where the ring network identifier is uniquely corresponding to the first node connected to the destination MAC address; and obtain path state information of a link corresponding to the ring network identifier; and the first processing unit 53 is configured to transmit the first data traffic to the first node in a direction that is opposite to that of the link when the path state information indicates that the link is in a failure state.

Further, the apparatus may further include a detection packet receiving unit 54 and a link state recording unit 55, where the detection packet receiving unit 54 is configured to receive a link detection packet transmitted by the first node through the link before the forwarding entry stored in the local node is queried, where the link detection packet includes the ring network identifier and a link identifier of the link; and the link state recording unit 55 is configured to obtain the path state information of the link according to a reception situation of the link detection packet and record the ring network identifier, the link identifier of the link, and the path state information of the link in the forwarding entry.

Further, the apparatus may further include: a traffic receiving unit 56 and an identifier recording unit 57, where the traffic receiving unit 56 is configured to receive second data traffic transmitted by the first node before the first data traffic is received, where the second data traffic includes a source MAC address and the ring network identifier, the ring network identifier is corresponding to the source MAC address, the source MAC address is the same as the destination MAC address in the first data traffic, and the ring network identifier is set by the first node; and the identifier recording unit 57 is configured to record correspondence between the source MAC address and the ring network identifier in the forwarding entry.

Further, the apparatus also includes: an identifier deleting unit 58, configured to delete the ring network identifier in the second data traffic before the second data traffic is transmitted.

Further, the link may include a first path and a second path that form a ring shape, where the first node is connected to a first interface of the local node through the first path, the first node is connected to a second interface of the local node through the second path; then at this time, the first querying unit 52 is specifically configured to obtain path state information of the first path and the second path corresponding to the ring network identifier; and the ring network identifier is bound to the first interface to indicate that the first data traffic is to be transmitted through the first interface; and the first processing unit 53 is specifically configured to transmit the first data traffic to the first node through the second interface corresponding to the second path when the path state information of the first path indicates that the first path is in a failure state.

By setting units such as the first querying unit and the first processing unit, the ring network failure switching apparatus in this embodiment obtains the corresponding ring network identifier and the path state information of the link according to the MAC address of the data traffic, and transmits the data traffic in a direction that is opposite to that of the link when the link is in a failure state, thereby solving problems of complexity and low efficiency of a ring network failure processing manner, simplifying a failure switching process, and greatly increasing switching efficiency.

Embodiment 5

Figure 7:
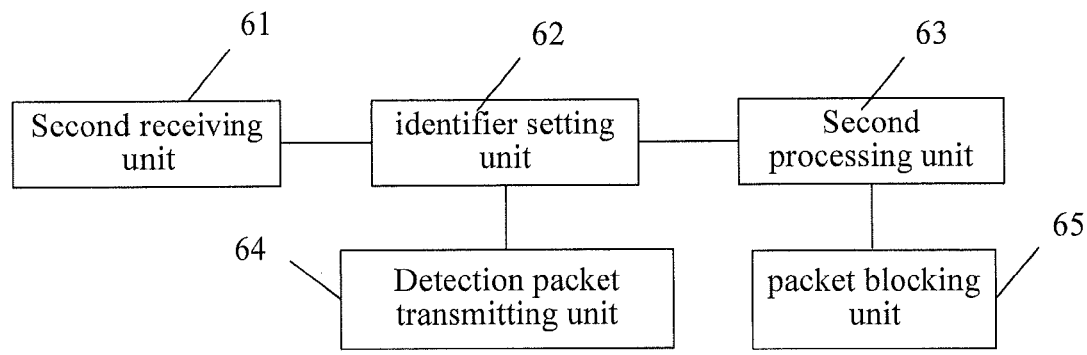
FIG. 7 is a schematic structural diagram of another embodiment of a ring network failure switching apparatus according to the present application.

FIG. 7 is a schematic structural diagram of an embodiment of a ring network failure switching apparatus according to the present application. The apparatus may be the R1 in FIG. 4, which can implement a ring network failure switching method in any embodiment of the present application. In the embodiment, a structure of the apparatus is briefly described. Reference may be made to the method embodiments for working principles of the apparatus, which are not repeated herein.

As shown in FIG. 7, the apparatus may include: a second receiving unit 61, an identifier setting unit 62, a second processing unit 63, and a detection packet transmitting unit 64, where the second receiving unit 61 is configured to receive second data traffic, where the second data traffic includes a source MAC address; the identifier setting unit 62 is configured to set, in the second data traffic, a ring network identifier that is uniquely corresponding to a local node;

the second processing unit 63 is configured to transmit the second data traffic in which the ring network identifier is set to the second node, so that the second node records correspondence between the source MAC address and the ring network identifier in a forwarding entry; and the detection packet transmitting unit 64 is configured to transmit a link detection packet to the second node through the link, where the link detection packet includes the ring network identifier and a link identifier of the link; so that the second node obtains path state information of the link according to a reception situation of the link detection packets and records the ring network identifier, the link identifier of the link, and the path state information of the link in the forwarding entry;

so that when receiving first data traffic that includes a destination MAC address, the second node queries the forwarding entry stored in the local node according to the destination MAC address to obtain the ring network identifier corresponding to the destination MAC address and the path state information of the link corresponding to the ring network identifier; and when the path state information indicates that the link is in a failure state, the second node transmits the first data traffic to the first node in a direction that is opposite to that of the link, where the source MAC address is the same as the destination MAC address.

Further, the identifier setting unit 62 is specifically configured to set the ring network identifier that is uniquely corresponding to the local node behind a link layer packet header of the second data traffic and in front of a data bearing layer of the second data traffic.

Further, the detection packet transmitting unit 64 is further configured to set ring network attribute information in the link detection packet, where the ring network attribute information includes an interval for transmitting the link detection packet, a local node device identifier, local node device load information, and traffic information and quality information of the link.

Further, the apparatus may further include: a packet blocking unit 65, configured to: after the second data traffic in which the ring network identifier is set is transmitted to the second node, discard the second data traffic that returns after passing through the second node and being transmitted along the ring network when the second data traffic is received.

Further, the link may include a first path and a second path that form a ring shape, where the local node is connected to a first interface of the second node through the first path, and the local node is connected to a second interface of the second node through the second path; then at this time, the detection packet transmitting unit 64 is specifically configured to transmit a first link detection packet to the second node through the first path and transmit a second link detection packet to the second node through the second path.

Further, the detection packet transmitting unit 64 is further configured to set, in the first link detection packet, a first priority for the first path, and set, in the second link detection packet, a second priority for the second path, where the first priority and the second priority are different.

By setting units such as the identifier setting unit and the detection packet transmitting unit, the ring network failure switching apparatus in this embodiment obtains the corresponding ring network identifier and the path state information of the link according to the MAC address of the data traffic, and transmits the data traffic in a direction that is opposite to that of the link when the link is in a failure state, thereby solving problems of complexity and low efficiency of a ring network failure processing manner, simplifying a failure switching process, and greatly increasing switching efficiency.

A person of ordinary skill in the art may understand that, all or a part of the steps of the foregoing method embodiments may be implemented by a program instructing relevant hardware. The program may be stored in a computer readable storage medium. When the program runs, the steps of the foregoing method embodiments are performed. The storage medium may be any medium that is capable of storing program codes, such as a ROM, a RAM, a magnetic disk, or an optical disc.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A ring network failure switching method, wherein the ring network comprises a local node, a first node, and a link that connects the local node to the first node; the switching method comprises:

receiving, by the local node, first data traffic, wherein the first data traffic comprises a destination media access control (MAC) address;

querying, by the local node, a forwarding entry stored in the local node according to the destination MAC address, to obtain a ring network identifier corresponding to the destination MAC address, wherein the ring network identifier is uniquely corresponding to the first node connected to the destination MAC address; and obtain path state information of the link corresponding to the ring network identifier; and transmitting, by the local node, the first data traffic to the first node in a direction that is opposite to that of the link when the path state information of the link indicates that the link is in a failure state;

wherein before the receiving the first data traffic, the method further comprises:

receiving, by the local node, second data traffic transmitted by the first node, wherein the second data traffic comprises a source MAC address and the ring network identifier, the ring network identifier is corresponding to the source MAC address, the source MAC address is the same as the destination MAC address in the first data traffic, the ring network identifier is set by the first node, and recording, by the local node, correspondence between the source MAC address and the ring network identifier in the forwarding entry.

2. The method of claim 1, wherein before the querying, by the local node, the forwarding entry stored in the local node, the method further comprises:

receiving, by the local node, a link detection packet transmitted by the first node through the link, wherein the link detection packet comprise the ring network identifier and a link identifier of the link; and obtaining, by the local node, the path state information of the link according to a reception situation of the link detection packet; and recording the ring network identifier, the link identifier of the link, and the path state information of the link in the forwarding entry.

3. The method of claim 1, wherein if the second data traffic is transmitted out of the ring network from the local node, before the second data traffic is transmitted, the method further comprises:

deleting, by the local node, the ring network identifier in the second data traffic.

4. The method of claim 1, wherein the link comprises a first path and a second path that form a ring shape; the first node is connected to a first interface of the local node through the first path, and the first node is connected to a second interface of the local node through the second path;

the obtaining path state information of the link corresponding to the ring network identifier comprises: obtaining, by the local node, path state information of the first path and path state information of the second path corresponding to the ring network identifier, wherein the ring network identifier is bound to the first interface to indicate that the first data traffic is to be transmitted through the first interface; and the transmitting, by the local node, the first data traffic to the first node in a direction that is opposite to that of the link when the path state information of the link indicates that the link is in a failure state comprises: transmitting, by the local node, the first data traffic to the first node through the second interface corresponding to the second path when the path state information of the first link indicates that the first link is in the failure state.

5. A ring network failure switching method, wherein the ring network comprises a local node, a second node, and a link that connects the local node to the second node; the method comprises:

receiving, by the local node, data traffic, wherein the data traffic comprises a source media access control (MAC) address;

setting, by the local node, in the data traffic, a ring network identifier that is corresponding to the source MAC address;

transmitting, by the local node, the data traffic in which the ring network identifier is set to the second node, wherein the data traffic in which the ring network identifier is set is configured to record correspondence between the source MAC address of the data traffic and the ring network identifier in the second node; and transmitting, by the local node, a link detection packet to the second node through the link, wherein the link detection packet comprises the ring network identifier, wherein the link detection packet is configured to obtain path state information of the link by the second node.

6. The method of claim 5, wherein the setting, in the data traffic, the ring network identifier that is corresponding to the source MAC address specifically comprises:

setting the ring network identifier that is corresponding to the source MAC address behind a link packet header of the data traffic and before a data bearing layer of the data traffic.

7. The method of claim 5, further comprising: setting ring network attribute information in the link detection packet, wherein the ring network attribute information comprises an interval for transmitting the link detection packet, a local node device identifier, local node device load information, and traffic information of the link and quality information of the link.

8. The method of claim 5, wherein after the transmitting the data traffic in which the ring network identifier is set to the second node, the method further comprises:

discarding the data traffic that returns after passing through the second node and being transmitted along the ring network when the data traffic is received.

9. The method of claim 5, wherein the link comprises a first path and a second path that form a ring shape; the local node is connected to a first interface of the second node through the first path and the local node is connected to a second interface of the second node through the second path;

the transmitting the link detection packet to the second node through the link comprises: transmitting a first link detection packet to the second node through the first path, and transmitting a second link detection packet to the second node through the second path.

10. The method of claim 9, wherein the transmitting the link detection packet to the second node through the link further comprises:

in the first link detection packet, setting a first priority for the first path, and in the second link detection packet, setting a second priority for the second path, wherein the first priority and the second priority are different.

11. A ring network failure switching apparatus, wherein the ring network failure switching apparatus comprises computer hardware coupled with a non-transitory computer readable storage medium, the computer hardware configured to:

receive first data traffic, wherein the first data traffic comprises a destination media access control (MAC) address;

query a forwarding entry stored in a local node according to the destination MAC address to obtain a ring network identifier corresponding to the destination MAC address and path state information of a link corresponding to the ring network identifier, wherein the ring network identifier is uniquely corresponding to the first node connected to the destination MAC address;

transmit the first data traffic to the first node in a direction that is opposite to that of the link when the path state information of the link indicates that the link is in a failure state;

receive second data traffic transmitted by the first node before the first data traffic is received, wherein the second data traffic comprises a source MAC address and the ring network identifier, the ring network identifier is corresponding to the source MAC address, the source MAC address is the same as the destination MAC address in the first data traffic, and the ring network identifier is set by the first node; and record correspondence between the source MAC address and the ring network identifier in the forwarding entry.

12. The apparatus of claim 11, wherein the computer hardware is further configured to:

receive a link detection packet transmitted by the first node through the link before the forwarding entry stored in the local node is queried, wherein the link detection packet comprise the ring network identifier and a link identifier of the link;

obtain the path state information of the link according to a reception situation of the link detection packet and record the ring network identifier, the link identifier of the link, and the path state information of the link in the forwarding entry.

13. The apparatus of claim 11, wherein if the second data traffic is transmitted out of the ring network from the local node, wherein the computer hardware is further configured to:

delete the ring network identifier in the second data traffic before the second data traffic is transmitted.

14. The apparatus of claim 11, wherein the link comprises a first path and a second path that form a ring shape; the first node is connected to a first interface of the local node through the first path and the first node is connected to a second interface of the local node through the second path;

the computer hardware is further configured to obtain path state information of the first path and path state information of the second path corresponding to the ring network identifier; and the ring network identifier is bound to the first interface to indicate that the first data traffic is to be transmitted through the first interface; and the computer hardware is further configured to transmit the first data traffic to the first node through the second interface corresponding to the second path when the path state information of the first path indicates that the first path is in a failure state.

15. A ring network failure switching apparatus, wherein the ring network comprises a local node, a second node, and a link that connects the local node to the second node; the apparatus comprises computer hardware coupled with a non-transitory computer readable storage medium, the computer hardware configured to:

receive data traffic, wherein the data traffic comprises a source media access control (MAC) address;

set, in the data traffic, a ring network identifier that is corresponding to the source MAC address;

transmit the data traffic in which the ring network identifier is set to the second node, wherein the data traffic in which the ring network identifier is set is configured to record correspondence between the source MAC address of the data traffic and the ring network identifier in the second node; and transmit a link detection packet to the second node through the link, wherein the link detection packet comprise the ring network identifier and a link identifier of the link, wherein the link detection packet is configured to obtain path state information of the link by the second node.

16. The apparatus of claim 15, wherein the computer hardware is further configured to:

set the ring network identifier that is uniquely corresponding to the local node behind a link layer packet header of the data traffic and before a data bearing layer of the data traffic.

17. The apparatus of claim 15, wherein the computer hardware is further configured to:
set ring network attribute information in the link detection packet, wherein the ring network attribute information comprises an interval for transmitting the link detection packet, a local node device identifier, local node device load information, traffic information of the link and quality information of the link.

18. The apparatus of claim 15, wherein the computer hardware is further configured to:
after the data traffic in which the ring network identifier is set is transmitted to the second node, discard the data traffic that returns after passing through the second node and being transmitted along the ring network when the data traffic is received.

19. The apparatus of claim 15, wherein the link comprises a first path and a second path that form a ring shape; the local node is connected to a first interface of the second node through the first path and the local node is connected to a second interface of the second node through the second path; and
the computer hardware is further configured to transmit a first link detection packet to the second node through the first path and transmit second link detection packet to the second node through the second path.

20. The apparatus of claim 19, wherein the computer hardware is further configured to:
set, in the first link detection packet, a first priority for the first path and set, in the second link detection packet, a second priority for the second path, wherein the first priority and the second priority are different.

* * * * *